(12) United States Patent
Billovits et al.

(10) Patent No.: US 8,911,625 B2
(45) Date of Patent: Dec. 16, 2014

(54) SPIRAL WOUND MODULE INCLUDING MEMBRANE SHEET WITH CAPILLARY CHANNELS

(75) Inventors: Gerald F. Billovits, Midland, MI (US); Thomas E. Fisk, Green Valley, AZ (US); Steven D. Jons, Eden Prairie, MN (US); David J. Moll, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 562 days.

(21) Appl. No.: 13/320,756

(22) PCT Filed: Jul. 1, 2010

(86) PCT No.: PCT/US2010/040780
§ 371 (c)(1),
(2), (4) Date: Nov. 16, 2011

(87) PCT Pub. No.: WO2011/005657
PCT Pub. Date: Jan. 13, 2011

(65) Prior Publication Data
US 2012/0097597 A1    Apr. 26, 2012

Related U.S. Application Data

(60) Provisional application No. 61/224,092, filed on Jul. 9, 2009.

(51) Int. Cl.
*B01D 63/10* (2006.01)
*B01D 65/00* (2006.01)

(52) U.S. Cl.
CPC .............. *B01D 63/10* (2013.01); *B01D 63/103* (2013.01); *B01D 65/003* (2013.01); *B01D 2313/04* (2013.01); *B01D 2313/146* (2013.01)

USPC ............. 210/321.85; 210/32.82; 210/321.74; 210/321.76

(58) Field of Classification Search
None
See application file for complete search history.

(56) References Cited

U.S. PATENT DOCUMENTS

| | | | | |
|---|---|---|---|---|
| 3,397,790 A | * | 8/1968 | Navoy et al. | 210/321.83 |
| 3,554,378 A | * | 1/1971 | Kohl | 210/321.83 |
| 4,021,351 A | | 5/1977 | Bray | |
| 4,128,479 A | | 12/1978 | Malchesky et al. | |
| 4,277,344 A | | 7/1981 | Cadotte | |
| 4,834,881 A | | 5/1989 | Sawada et al. | |
| 5,046,936 A | | 9/1991 | Bourdiol et al. | |
| 5,089,187 A | * | 2/1992 | Aptel et al. | 264/41 |
| 5,114,582 A | | 5/1992 | Sandstrom et al. | |
| 5,147,541 A | * | 9/1992 | McDermott et al. | 210/321.74 |
| 5,171,493 A | | 12/1992 | Aptel et al. | |

(Continued)

FOREIGN PATENT DOCUMENTS

| | | |
|---|---|---|
| CH | 500742 | 12/1970 |
| DE | 4123125 | 1/1993 |

(Continued)

*Primary Examiner* — Krishnan S Menon
(74) *Attorney, Agent, or Firm* — Edward W. Black

(57) ABSTRACT

The invention includes a spiral wound module comprising at least one membrane sheet wrapped about a permeate collection tube wherein the membrane sheet (14) comprises a plurality of capillary channels in parallel arrangement with each other and which are in fluid communication with the permeate collection tube (12). Many additional embodiments are disclosed along with methods for making and using the module and corresponding components.

9 Claims, 6 Drawing Sheets

(56) References Cited

U.S. PATENT DOCUMENTS

| | | |
|---|---|---|
| 5,538,642 A | 7/1996 | Solie |
| 5,681,467 A | 10/1997 | Solie et al. |
| 6,066,254 A | 5/2000 | Huschke et al. |
| 6,299,772 B1 | 10/2001 | Huschke et al. |
| 6,632,356 B2 | 10/2003 | Hallan et al. |
| 6,787,216 B1* | 9/2004 | Koenhen ................ 428/188 |
| 6,878,278 B2 | 4/2005 | Mickols |
| 6,881,336 B2 | 4/2005 | Johnson |
| 7,048,855 B2 | 5/2006 | de la Cruz |
| 7,459,082 B2 | 12/2008 | Tung et al. |
| 2005/0121380 A1* | 6/2005 | De La Cruz ............ 210/321.83 |
| 2007/0272628 A1 | 11/2007 | Mickols et al. |
| 2008/0164208 A1 | 7/2008 | Doyen et al. |
| 2008/0185332 A1 | 8/2008 | Niu et al. |
| 2008/0290031 A1 | 11/2008 | Popa et al. |
| 2009/0011182 A1 | 1/2009 | Mackley et al. |
| 2011/0111122 A1 | 5/2011 | Mues et al. |

FOREIGN PATENT DOCUMENTS

| | | |
|---|---|---|
| EP | 0259109 | 3/1988 |
| FR | 2445163 | 7/1980 |
| FR | 2616812 | 12/1988 |
| JP | 59082906 | 5/1984 |
| JP | 10137558 | 5/1998 |
| JP | 11114381 | 4/1999 |
| WO | 8102750 | 10/1981 |
| WO | 2006043884 | 4/2006 |
| WO | 2006091167 | 8/2006 |

* cited by examiner

SPIRAL WOUND MODULE INCLUDING MEMBRANE SHEET WITH CAPILLARY CHANNELS

CROSS REFERENCE STATEMENT

This is a U.S. National Application filed under 35 U.S.C. 371, and claims the benefit of International Application No. PCT/US2010/040780, filed Jul. 1, 2010, and U.S. Provisional Application No. 61/224,092, filed Jul. 9, 2009, the entire contents of which is are incorporated herein by reference.

BACKGROUND ART

The present invention is generally directed toward spiral wound modules. Spiral wound modules (also referred to as spiral wound "elements") are well known for use in a variety of fluid separations including both gas and liquid phase separations. Due to their spiral configuration, a relatively large membrane surface area can be packed into an individual module. Depending upon the type of membrane utilized, spiral wound modules can be used in a wide variety of applications including: reverse osmosis (RO), nanofiltration (NF), ultrafiltration (UF) and microfiltration (MF). A typical module comprises at least one membrane sheet wrapped about a permeate collection tube. Examples of such modules are described in U.S. Pat. No. 5,114,582; U.S. Pat. No. 5,538,642; and U.S. Pat. No. 5,681,467. Such modules commonly include feed spacer sheets to facilitate flow of feed fluid thru the module, as described in U.S. Pat. No. 6,881,336. In use, multiple modules may be interconnected by way of end caps as described in U.S. Pat. No. 6,632,356, with multiple modules housed within a common pressure vessel as described in US 2007/0272628. Alternatively, a single module may be utilized as described in U.S. Pat. No. 6,066,254 and U.S. Pat. No. 6,299,772.

Composite membrane sheets are commonly used in spiral wound modules. Examples include FilmTec Corporation's FT-30™ membrane—a porous polysulfone sheet including a thin film polyamide discriminating layer formed by an interfacial polycondensation reaction between a polyfunctional amine monomer and a polyfunctional acyl halide monomer. Representative examples of such membranes are described in U.S. Pat. No. 4,277,344; U.S. Pat. No. 6,878,278; and US 2008/0185332.

An alternative type of membrane sheet includes a porous structure including integral capillary channels as described in U.S. Pat. No. 5,046,936; U.S. Pat. No. 5,089,187; U.S. Pat. No. 5,171,493; U.S. Pat. No. 6,787,216 and US 2009/0011182. Such membranes may be extruded from a polymer mixture (e.g. polysulfone, polyether sulfone, polyvinylidene fluoride) into a porous sheet including a plurality of parallel aligned capillary channels. U.S. Pat. No. 6,787,216; JP 59-82906 and FR 2,616,812 further describe the use of such membrane sheets within spiral wound modules wherein the capillary channels serve as feed fluid pathways. WO1981/002750 describes the manufacture and use of similar membrane sheets in connection with dialyzers.

STATEMENT OF INVENTION

The invention includes a spiral wound module comprising at least one membrane sheet wrapped about a permeate collection tube wherein the membrane sheet comprises a plurality of capillary channels in parallel arrangement with each other and which are in fluid communication with the permeate collection tube. Many additional embodiments are disclosed along with methods for making and using the module and corresponding components.

BRIEF DESCRIPTION OF THE FIGURES

The included Figures illustrate several embodiments of the subject spiral wound module along with selected component parts. The Figures are not to scale and include idealized views to facilitate description. Where possible, like numerals have been used throughout the Figures and written description to designate the same or similar features.

DETAILED DESCRIPTION

The invention includes a spiral wound module comprising at least one membrane sheet wrapped about a permeate collection tube. The membrane sheet comprises a plurality of capillary channels which are in parallel arrangement with each other and which are in fluid communication with the permeate collection tube. Means for perfecting the fluid communication between the capillary channels and the permeate collection tube are not particularly limited and several embodiments are described. In one embodiment, the capillary channels are generally perpendicular to the permeate collection tube such that feed and permeate fluid are in a cross-flow configuration. The outer surfaces of the membrane sheet may optionally include a discriminating layer. The use of a discriminating layer may be particularly useful in RO applications.

Figure 1:
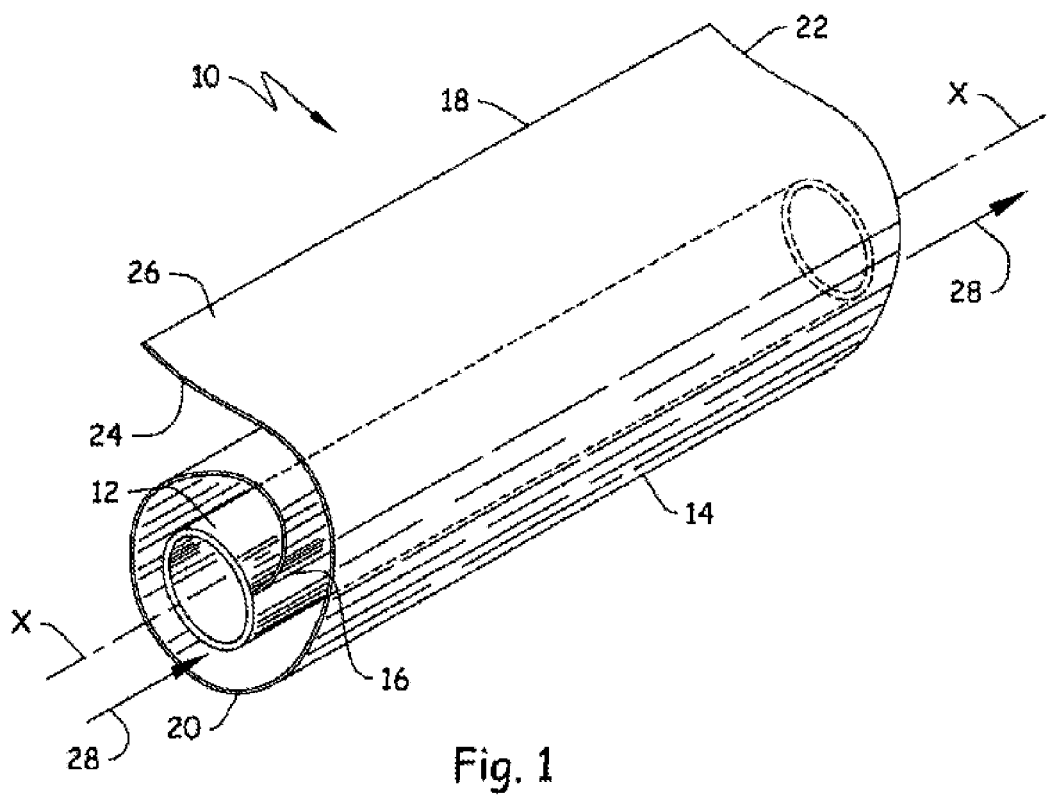
FIG. 1 is a perspective view of a partially assembled spiral wound module including a single membrane sheet attached to a permeate collection tube extending along an axis (X).

One embodiment of the invention is illustrated in FIG. 1. A partially assembled spiral wound module is generally shown at (10) including a permeate collection tube (12) extending along an axis (X). A single membrane sheet (14) is shown partially wrapped about the tube (12). The membrane sheet (14) is rectangular and includes four edges (16, 18, 20, 22) and two opposing outer surfaces (24, 26). A proximal edge

(16) of the membrane sheet (14) is positioned adjacent to the permeate collection tube (12) and extends along at least a portion of its length. During assembly, the membrane sheet (14) is concentrically rolled or "wrapped" about the tube (12) so that a distal edge (18) of the sheet (14) is located at an outermost concentric surface of the rolled membrane sheet (14). In FIG. 1, distal edge (18) is shown extending tangentially outward from the tube (12), thus representing an intermediate stage in module assembly. Once fully assembled, the entire membrane sheet (14) is wrapped about the tube (12) and secured by known means such as by tape, sealant or an outer housing. During operation, feed fluid flows into the module (10), entering near a front edge (20) of the membrane sheet (14) and passing along a feed fluid pathway (28) extending along the outer surfaces (24, 26) of the membrane sheet (14), along a route roughly parallel to the axis (X) defined by the permeate collection tube (12), and exiting the module (10) near a back edge (22) of the membrane sheet (14). In the illustrated embodiment, feed fluid flow is generally "cross-current" to permeate fluid flow. Details regarding permeate fluid flow are describe below.

Figure 2:
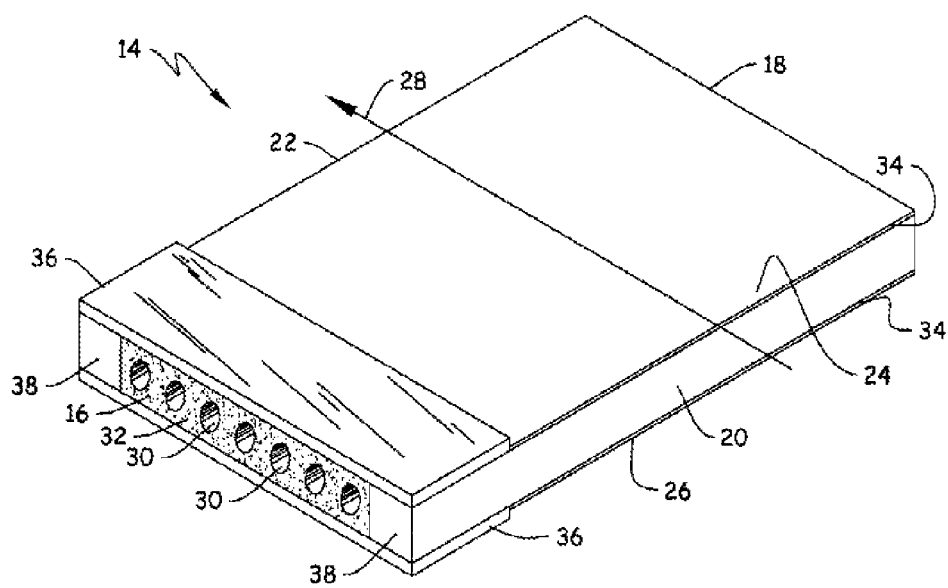
FIG. 2 is a perspective view of a membrane sheet including capillaries channels.

FIG. 2 illustrates an embodiment of the membrane sheet (14). As shown, the membrane sheet (14) is rectangular and includes four edges: a proximal edge (16) and distal edge (18) which are approximately parallel to each other, and a front edge (20) and back edge (22) which both extend from the proximal edge (16) to distal edge (18). The membrane sheet (14) further includes a first (24) and second (26) opposing outer surface and a plurality of continuous capillary channels (30) positioned between the first (24) and second (26) outer surfaces which extend in parallel arrangement from the proximal edge (16) to the distal edge (18). During module assembly, the proximal edge (16) of the membrane sheet (14) is located "proximal" (i.e. adjacent) to the permeate collection tube (not shown) and extends along a portion of the tube's length. The capillary channels (30) located along the proximal edge (16) are in fluid communication with the permeate collection tube (not shown). In one embodiment, the ends of the capillary channels along the proximal edge are open and the ends of the capillary channels (30) located at the distal edge (18) are closed. Even though shown in an un-wound configuration, the feed fluid pathway (28) is shown across the first outer surface (24) to illustrate the cross-current orientation with the capillary channels (30).

The membrane sheet (14) preferably comprises a porous structure (32) which provides for selective fluid communication between the feed fluid pathway (28) and the capillary channels (30). That is, portions of the feed fluid passing along the pathway (28) are able to selectively pass through the outer surfaces (24, 26) of the membrane sheet (14) and enter the capillary channels (30). The resulting fluid is referred to herein as "permeate". The nature of the porous structure (32) is not particularly limited and is typically a function of the material and manufacturing technique along with the end use application (e.g. RO, UF, MF, gas separations, liquid separations, etc.). In many embodiments, the porous structure is produced by extruding a polymer mixture into a sheet including capillary channels, followed by a phase inversion or separation process which creates the desired porosity. Other well known techniques such as stretching and the use of porogens may also be used. The size and distribution of pores throughout the structure can be controlled via known techniques. Depending upon the end use application, the average pore sizes may range from 0.001 to 100 microns, but in many applications the average pore size will range from 0.01 to 10 microns. The porous structure may be isotropic or anisotropic. The porosity of the porous structure is preferably at least 50%. Polymers useful in preparing such porous structures include: polysulfone, poly(ether sulfone) and poly(vinylidene fluoride). Methods for making such membrane sheets including capillary channels and porous structures are described in WO1981/02750; U.S. Pat. No. 5,046,936; U.S. Pat. No. 5,089,187; U.S. Pat. No. 5,171,493; U.S. Pat. No. 6,787,216 and US 2009/0011182.

In one embodiment, the membrane sheet (14) comprises a discriminating layer (34) disposed upon at least a portion of the first (24) and second (26) outer surfaces of the membrane sheet (14). In operation, feed fluid flowing along the feed fluid pathway (28) passes across the discriminating layer (34). The discriminating layer (34) provides the primary means of separation of the membrane sheet (14); whereas, the underlying porous structure primarily serves as a support which preferably offers relatively little resistance to fluid flow. In one embodiment, the discriminating layer (34) comprises a porous region having a smaller average pore size (e.g. less than 50%) than the bulk of the porous structure of the membrane sheet (i.e. anisotropic structure). Other types of discriminating layers may also be used, including laminated layers, coated layers and co-extruded layers. In preferred embodiments, the discriminating layer is relatively thin as compared with the overall thickness of the membrane sheet, e.g. less than 5 microns and in several embodiments less than 1 micron. A variety of materials may be used to form a discriminating layer, including but not limited to cellulose acetate and poly(ethersulfone). In yet another embodiment, the discriminating layer comprises a thin-film, such as a polyamide layer which may be formed via an interfacial polycondensation reaction between a polyfunctional amine monomer and a polyfunctional acyl halide monomer, such as by way of sequential coating of the opposing outer surfaces (24, 26) of the membrane sheet (14) with an aqueous solution of amine followed by an organic-based solution of polyfunctional acyl halide monomer. This general reaction and methods for preparing composite thin-film membranes are well known in the art. While such polyamide discriminating layers are commonly used in RO and NF applications (depending upon the size of the solute to be rejected), the separation mechanism for both is based upon diffusion rather than size exclusion via pores. The polyamide layer is preferably very thin, e.g. less than 5 µm (micron), preferably from 0.05 to 5 µm, but more preferably 0.1 to 0.5 µm; and is preferably without discrete pores. For purposes of the present description, it will be understood that references to "reverse osmosis" (RO) also includes nano-filtration (NF) unless otherwise stated. Both processes are often collectively referred to in the literature as "hyperfiltration". While not shown, other embodiments of the membrane sheet do not include a discriminating layer. That is, the porous structure of the membrane sheet provides the means of separation. Such embodiments may be particularly suited for microfiltration (MF) applications. While described as being disposed upon at least a portion of the outer surfaces of the membrane sheet, a discriminating layer may alternatively or additionally be disposed upon the walls of all or some fraction of the capillary channels.

Figure 4:
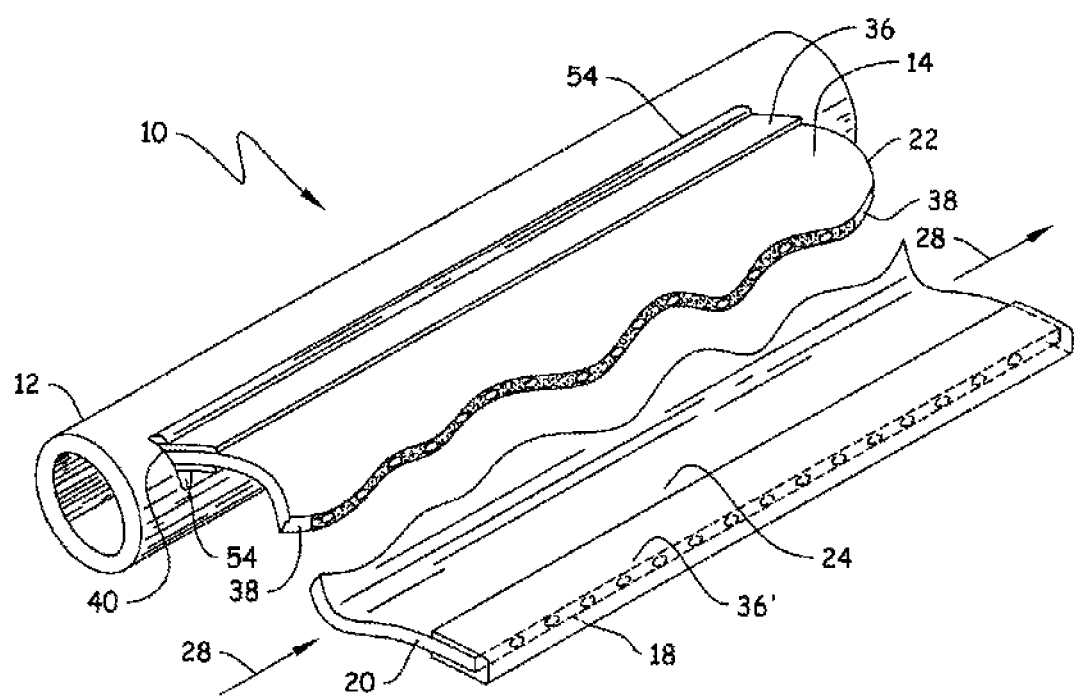
FIG. 4 is a perspective view of a partially assembled spiral wound module including a permeate collection tube of FIG. 3A and a single membrane sheet.

The membrane sheet (14) may further include a reinforcement layer (36) disposed upon a portion of the first (24) and second (26) outer surfaces of the membrane sheet (14) which extends from the front edge (20) to the back edge (22) of the membrane sheet (14) along a path adjacent to the proximal edge (16). The reinforcement layer (36) may serve a variety of functions including providing a means for handling the membrane sheet or providing a strong substrate for securing or attaching the membrane sheet to an adjacent membrane sheet (not shown) or to a permeate collection tube (not shown). In one embodiment, the reinforcement layer (36) is a strip of tape or flexible plastic adhered or fixed to the first (24) and second (26) outer surfaces of the membrane sheet along the proximal edge (16). In embodiments wherein a polyamide discriminating layer (34) are included, it may be preferable to apply the reinforcement layer (36) directly to the underlying porous structure (32) of the membrane sheet (14) rather than directly upon the discriminating layer (34). While not shown, a reinforcement layer may also or alternatively be disposed upon a portion of the first (24) and second (26) outer surfaces of the membrane sheet (14) which extends from the front edge (20) to the back edge (22) of the membrane sheet (14) along a path adjacent to the distal edge (18). In one such embodiment (as shown in FIG. 4), the reinforcement layer may wrap around the distal edge (18) in a manner to effectively seal the capillary channels (30) at the distal edge (18) of the membrane sheet (14). In yet another embodiment, the reinforcement layer comprises an impermeable material which prevents flow of fluid. In several embodiments, the reinforcement layer has a width of 1 to 10 mm extending from the proximal or distal end of the membrane.

At least one, but preferably both the front (20) and back (22) edges of the membrane sheet (14) comprise a non-porous structure (38), which preferably has a tensile strength significantly greater than that of the porous structure (32), e.g. at least twice but preferably at least four times the tensile strength of the porous structure. In order to further increase strength, the front (20) and back (22) edges preferably include no capillary channels. Depending upon the embodiment, the front (20) and back (22) edges of the membrane sheet (14) may provide a useful structure for handling an otherwise delicate membrane sheet, particularly when handling a membrane sheet including a thin film discriminating layer (e.g. polyamide) which may be easily delaminated, scratched or otherwise damaged. For example, strong, non-porous front and back edges can be useful in drawing and coating operations or during module construction. The non-porous structure (38) may be formed by way of a variety of methods including: co-extrusion during the formation of the porous structure (32), application of a sealant to fill and seal open pores, lamination of a discrete non-porous layer onto the porous structure such as tape or other non-porous substrate secured by way of an adhesive, collapsing or filling the pore structure of a portion of the porous structure (32) by way of pressure (crimping) and/or heat, sonic welding or laser cutting of the porous structure. The non-porous structure (38) may have the same or different chemical composition as the porous structure (32). For example, non-porous structure (38) may be co-extruded using the same polymer mixture as the porous structure (32) but without porogens or other constituents responsible for pore formation. Alternatively, the non-porous structure (38) may comprise an entirely different chemical composition. In a preferred embodiment, the non-porous structure (38) is formed via co-extrusion simultaneously with the porous structure. Regardless of its chemical composition, the front (20) and back (22) edges are preferably impermeable. That is, feed fluid passing along the feed fluid pathway (28) is unable to pass through the non-porous structure (38) of the front (20) and back (22) edges.

The front (20) and back (22) edges of the membrane sheet may be different thickness than that of the remainder of the sheet, e.g. the edges may be thicker to provide a raised surface; however, the front and back edge preferably have a thickness substantially equivalent to the porous structure (32) of the membrane sheet (14), as shown in the embodiment illustrated in FIG. 2. Depending upon the end use application of the module and manufacturing technique, the average thickness of the membrane sheet may vary over a wide range of values. However, for most applications the membrane sheet has a relatively uniform average thickness (e.g. thickness various by less than 10% from the average) wherein the average thickness is typically from 0.1 to 10 mm, but more commonly from 0.25 to 2.5 mm. In RO applications, the average thickness of the membrane sheet is preferably less than 0.6 mm. The diameter and shape of the capillary channels are not particularly limited but are preferably elliptical, e.g. circular. Depending upon the methods used to produce the sheet, polygonal shapes, e.g. rectangular, diamond, and hexagonal are also possible. The diameter of the capillary channels is not particularly limited and is often determined by the limits of the manufacturing technique, materials of construction and pressure requirements dictated by the end use application of the module. For most applications, diameters of from 0.05 to 2 mm are suitable, with diameters of 0.2 to 0.5 being preferred. Center to center spacing of capillary channels is preferably from 0.1 to 2 mm, but more preferably from 0.2 to 0.8 mm, depending of course upon the diameter of the capillary channel. The width (i.e. length of proximal edge) of the membrane sheet is not particularly limited, but is preferably from about 10 cm to 110 cm. The length (i.e. length of the front edge) of the membrane sheet is not particularly limited, but is preferable from about 30 cm to 200 cm.

FIG. 3 illustrates several embodiments of applicable permeate collection tubes. While each illustrated embodiment is shown as being cylindrical in shape with a circular cross section, the inner and outer surfaces of the tube may also have other shapes including polygonal (e.g. hexagonal) or elliptical cross sections.

Figure 3A:
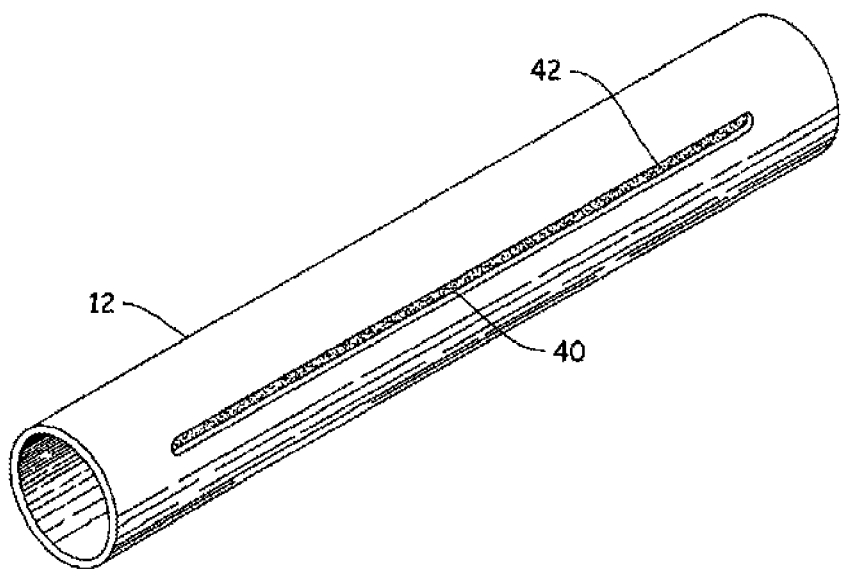
FIGS. 3A, 3B, 3C and 3D are perspective views (3B, 3C and 3D partially cut-away) of several different embodiments of permeate collection tubes.

FIG. 3A illustrates a permeate collection tube (12) including a slot (40) comprising an elongated aperture (42) which extends along a portion of the length of the tube (12). As will be described in connection with FIG. 4, the slot (40) may be adapted for receiving the proximal edge of the membrane sheet (not shown).

Figure 3B:
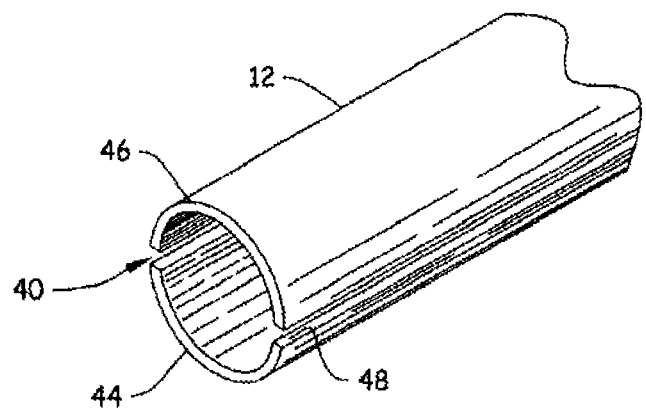

FIG. 3B illustrates another embodiment of a permeate collection tube (12) including two arc segments (44, 46) arranged to define a cylindrical tube, wherein an interface area (48) between directly adjacent arc segments (44, 46) defines a slot (40). As will be described in connection with FIG. 5, the slot (40) may be adapted for receiving a portion of the membrane sheet (not shown). While shown as including only two arc segments, additional arc segments may also be used.

Figure 3C:
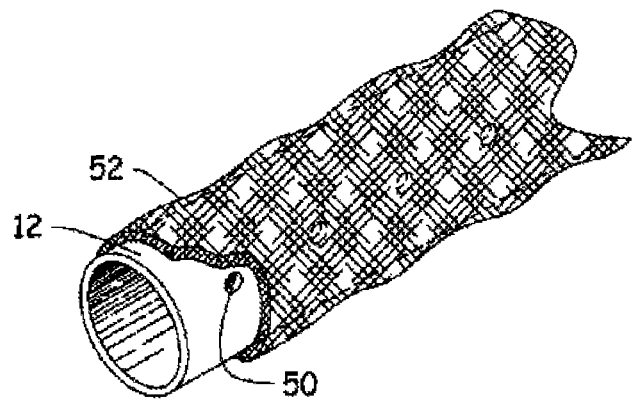

FIG. 3C illustrates another embodiment of a permeate collection tube (12) including at least one row of holes (50) along its length and an outer sheath (52) of highly porous material such as Tricot polyester woven material.

Figure 3D:
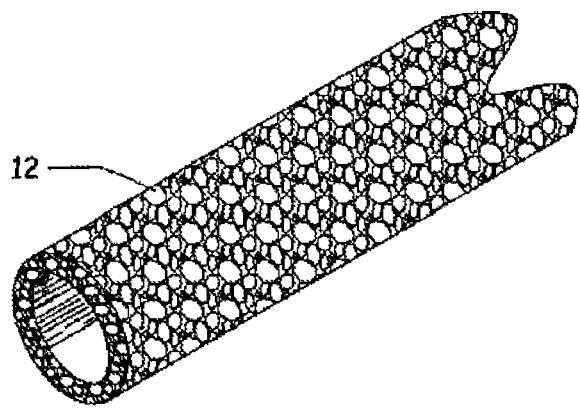

FIG. 3D illustrates yet another embodiment of a permeate collection tube (12) wherein the tube comprises a highly porous wall structure which permits fluid flow therethrough.

The permeate collection tubes may be made from a variety of materials including metals, ceramics, and plastics such as: polyethylene, polypropylene, polystyrene, polyvinylchloride, polysulfone, poly (phenylene oxide), and acrylonitrile-butadiene-styrene (ABS). Examples of other suitable embodiments are provided in U.S. Pat. No. 3,397,790; U.S. Pat. No. 4,021,351 and WO2006/043884.

In order to prevent mixing of feed and permeate fluids, the spiral wound module preferably includes a seal located upon each of the first and second outer surfaces of the membrane sheet which isolates the capillary channels from the feed fluid pathway. The structure and arrangement of the seal is not particularly limited and several embodiments are described.

Pressure changes within the module, such as those created during start-up or stoppage of flow of feed fluid, may cause the membrane sheet(s) to flex and shift within the module. As movement of the membrane sheet tends to be restricted at the location of the seal, shifting of the membrane sheet can result in damage (e.g., tearing) at locations at or near the seal. Such damage is of particular concern in embodiments wherein the seal is affixed to the outer surfaces of each membrane sheet and wherein the outer surfaces comprise a thin film discriminating layer. In such embodiments, movement of the membrane sheet can cause the discriminating layer to be pulled from the membrane at the seal location. Several embodiments are described which mitigate these concerns. One such embodiment includes a restraining member positioned near or directly adjacent the seal, at a location distal to the seal, (i.e. closer to the distal edge of the membrane sheet as compared with the seal). The restraining member is in contact with an outer surface of the membrane sheet and limits movement of the membrane sheet at locations distal to the seal, so as to prevent damage at or near the seal location. The restraining member preferably extends along less than 10%, more preferably less than 3% and still more preferably less than 1% of the length of the outer surface of the membrane sheet (i.e. wherein the "length" direction extends from the proximal edge to the distal edge of the membrane sheet).

Figure 5:
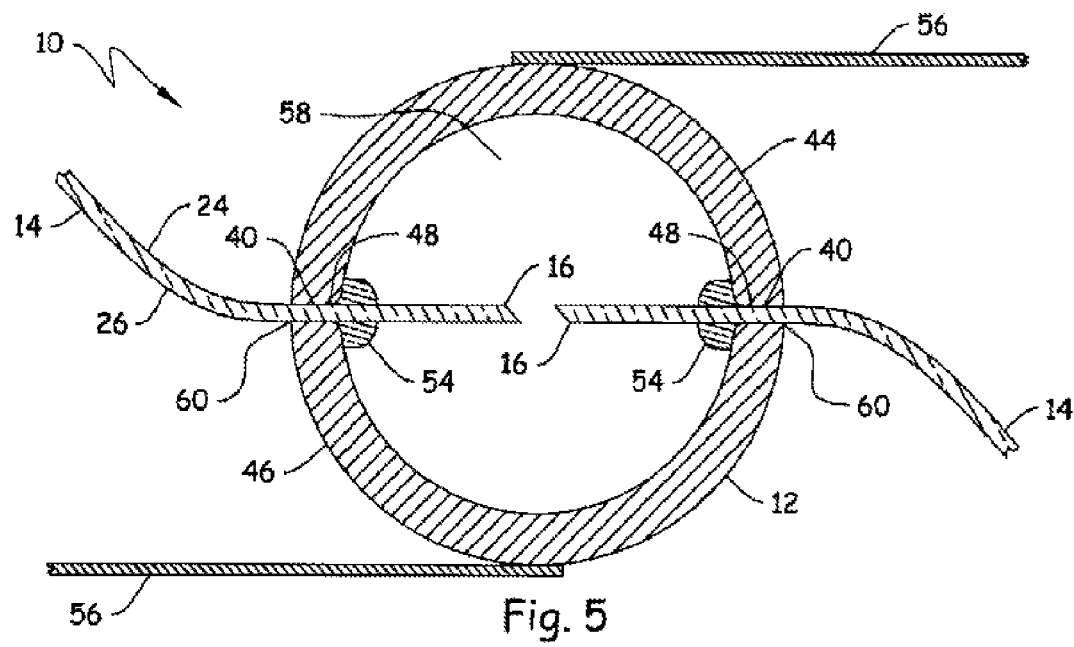
FIG. 5 is a sectional view (partially cut-away) of a partially assembled spiral wound module taken along a line perpendicular to the axis defined by a permeate collection tube, including two membrane sheets and two feed spacer sheets attached to the permeate collection tube. The permeate collection tube is intended to be the same as that shown in FIG. 3B.

FIG. 4 illustrates an embodiment of the invention including a partially assembled spiral wound module (10) including a permeate collection tube (12) as illustrated in FIG. 3A and a single membrane sheet (14) similar to that shown in FIG. 2. The proximal edge (not shown) of the membrane sheet (14) is disposed within the slot (40) provided within the outer wall of the permeate collection tube (12). A seal (54) is provided about the perimeter of the slot (40). In the embodiment shown, the seal (54) comprises a band or bead of sealant (such as a urethane, epoxy, hot melt adhesive or UV-curable material) located upon the first (24) and second (26) outer surfaces of the membrane sheet (14) and extends from the front edge (20) to the back edge (22) of the membrane sheet (14) along a path adjacent to the proximal edge (16). While shown in contact with the outer surface of the permeate collection tube (12), the seal (54) may alternatively, or additionally contact the corresponding inner surface of the tube (12) as shown in FIG. 5. As similarly illustrated in FIG. 2, the membrane sheet (14) includes a reinforcement layer (36) disposed upon a portion of the first (24) and second (26) outer surfaces of the membrane sheet (14) which extends along a path adjacent to the proximal edge (16). As previously described, the reinforcement layer (36) may comprise a strip of tape or other strong impermeable material. While the use of such a reinforcement layer (36) is optional, it can provide the membrane sheet (14) with a robust structure for attaching or applying the seal (54), as is shown in the embodiment illustrated in FIG. 4. As the seal restricts movement of the membrane sheet, the portion of the sheet in contact with or near the seal may be vulnerable to tearing or other damage, particularly at a most distal point of the seal. The use of a reinforcement layer (36) can be particularly useful in such embodiments, including those utilizing a thin film discriminating layer (not shown) as previously described in connection with FIG. 2. The reinforcement layer (36) can distribute forces that might otherwise be localized and cause damage, over a larger surface area. The reinforcement layer (36) also provides an effective means for handling the membrane sheet (14) during assembly of the module. An optional secondary reinforcement layer (36') may also be used along the corresponding distal edge (18) of the membrane sheet (14). For purposes of clarity, the first (24) and second (26) outer surfaces of the membrane sheet (14) include the outermost surface (i.e. surface opposite that in contact with the membrane sheet) of the reinforcement layer.

In operation, feed fluid flows along the feed fluid pathway (28). Portions of the feed fluid selectively pass through the first (24) and second (26) outer surfaces of the membrane sheet (14) and enter the capillary channels (30) which route the resulting permeate fluid to the permeate collection tube (12). The capillary channels (30) are open at the proximal edge of the membrane sheet and closed at the distal edge. The capillary channels (30) may be closed at the distal edge of the membrane sheet (14) by a variety of means and methods, including but not limited to the use of a reinforcement layer (36') such as a strip of impermeable tape disposed upon a portion of the first (24) and second (26) outer surfaces of the membrane sheet which extends from the front edge (20) to the back edge (22) along a path adjacent to the distal edge (18) of the membrane sheet (14) and which wraps around the distal edge (18). Other means of closing the capillary channels include the use of a sealant to fill and seal the open channel ends, or collapsing the channels by way of pressure (crimping) and/or heat.

FIG. 5 shows another embodiment of the invention including a sectional view of a partially assembled spiral wound module (10) including a permeate collection tube (12) as illustrated in FIG. 3B, two membrane sheets (14) similar to that shown in FIG. 2 and two feed spacer sheets (56). The selection of the feed spacer sheet (56) is not particularly limited and those described in U.S. Pat. No. 6,881,336 may be used. The permeate collection tube (12) includes two arc segments (44, 46) arranged to define a cylindrical tube with an inner chamber (58), wherein the interface areas (48) between directly adjacent arc segments (44, 46) defines a slot (40). While not shown in the sectional view of FIG. 5, at least one of the arc segments (44, 46) may be recessed in the interface area (48) over a central portion of its length to accommodate the membrane sheet while allowing contact between adjacent arc segments at the ends of the tube. A membrane sheet (14) is disposed within each slot (40) with its proximal edge (16) extending into the inner chamber (58) of the tube (12). A seal (54) is located in contact with the first (24) and second (26) surfaces of the membrane sheets (14) and the inner surface of the permeate collection tube (12). In the embodiment shown, the seal (54) comprises a bead or band of sealant disposed along the slot (40). While not shown, the seal may alternatively, or additionally be located along the interface areas (48) or along the slot (40) on the outside surface (60) of the permeate collection tube (12). During assembly, a single membrane sheet may be positioned between the two arc segments, and subsequently cut near a center point to create two proximal edges (16) of two membrane sheets (14) located within the inner chamber (58) of the permeate collection tube (12). Alternatively, two separate membrane sheets may be used and the step of membrane cutting during module assembly can be omitted. The arc segments (44, 46) may be held together to form a cylindrical tube by way of the previously described seal. In one embodiment, the arc segments (44, 46) may also be fixed together at the ends of the tube. When fully assembled, the two membrane sheets and feed spacer sheets are wrapped about the permeate collection tube such that the feed spacer sheets reside within the feed fluid pathway.

As previously noted, movement of the membrane sheet tends to be restricted at the location of the seal. As a consequence, the membrane sheet can be vulnerable to damage, e.g. tearing, at locations at or near the seal. In the embodiment of FIG. 5, the interface areas (48) and outside surface (60) of the permeate collection tube (12) serve as a restraining member which limits movement of the membrane sheet at locations distal to the seal. Thus, the restraining member can mitigate membrane tearing at the location of the seal.

Figure 6:
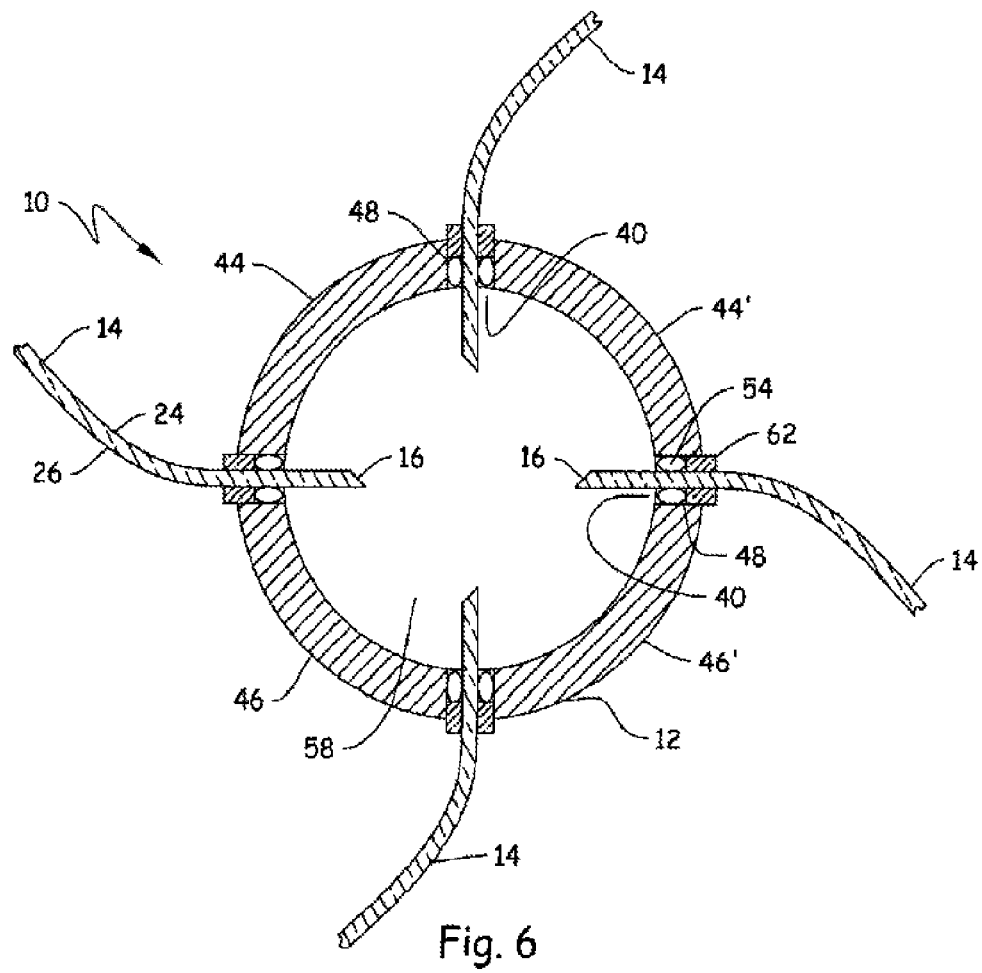
FIG. 6 is a sectional view (partially cut-away) of a partially assembled spiral wound module taken along a line perpendicular to the axis defined by a permeate collection tube, including four membrane sheets attached to the permeate collection tube.

FIG. 6 illustrates another embodiment of the invention showing a sectional view of a partially assembled spiral wound module (10) including a permeate collection tube (12) and four membrane sheets (14). In distinction from the embodiment of FIG. 5, four arc segments (44, 44', 46, 46') are combined to form the permeate collection tube (12). In further distinction, the seal (54) is located within the slot (40) created along the interface area (48) between adjacently positioned arc segments. In still further distinction from the embodiment of FIG. 5, a separate structure serves as a restraining member (62), which is positioned at a location distal to the seal (54) and in contact with outer surfaces (24, 26) of the membrane sheet. The restraining member (62) limits movement of the membrane sheet (14) at locations distal to the seal (i.e. locations closer to the distal edge of the membrane sheet as compared with the seal). While not particularly limited, the restraining member (62) may comprise a flexible member such as a compressible foam or similar flexible material which permits limited movement of the sheet (14). Preferably, the restraining member (62) is not fixed or chemically bonded to the membrane sheet; but rather is mechanically biased against one or more outer surfaces (24, 26) of the membrane sheet (14). The restraining member (62) may be secured, fixed or otherwise attached the permeate collection tube (12) or feed spacer sheet (as will be described in connection with FIG. 8). While not shown, feed spacer sheets such as those described with reference to FIG. 5 may optionally be used.

Figure 7:
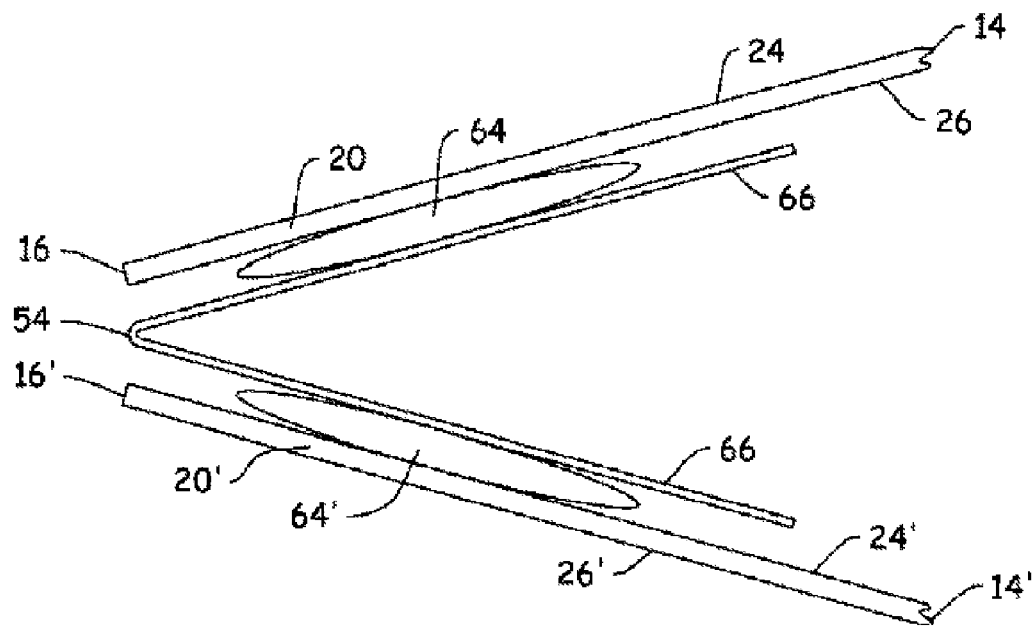
FIG. 7 is an idealized elevational view (partially cut-away) of two adjacently positioned membrane sheets and a seal located upon opposing (i.e. facing) outer surfaces of the membrane sheets.

FIG. 7 illustrates an idealized elevational view (partially cut-away) of two adjacently positioned membrane sheets (14, 14') and a seal (54) in contact with the opposing outer surfaces (24', 26) of the membrane sheets (14, 14'). In the illustrated embodiment, the seal (54) comprises a band of sealant (64, 64') disposed along a path from the front edge (20, 20') to the back edge (not shown) of each membrane sheet (14, 14'). The seal (54) further includes a flexible strip (66) located between the directly adjacent membrane sheets (14, 14') which is in contact with each band of sealant (64, 64'). The flexible strip (66) is preferably impermeable and serves to isolate the feed fluid pathway from the capillary channels located at the proximal edge (16, 16') of the membrane sheets (14, 14'). In this embodiment, the seal (54) comprising the flexible strip (66) allows relative movement of adjacent membrane sheets (14, 14') without causing damage to either at the seal location. While not shown, the seal may alternatively comprise a single band of sealant (preferably a flexible sealant) in contact with directly adjacent membrane sheets in an area adjacent to their proximal edges. In yet another non-illustrated embodiment, the seal may comprise a two-sided strip of tape or impermeable foam adhered directly to adjacent (i.e. facing) membrane sheets in a manner similar to that described in the embodiment illustrated in FIG. 7. The membrane sheet arrangement illustrated in FIG. 7 is particularly suited for use with permeate collection tube embodiments as shown in FIGS. 3C and 3D. When assembled into a module, the proximal edges of the membrane sheets are oriented to be adjacent to a permeate collection tube such that permeate fluid exiting capillary channels along the proximal edge of the membrane sheet flows into the permeate collection tube via holes or pores located therein.

Figure 8:
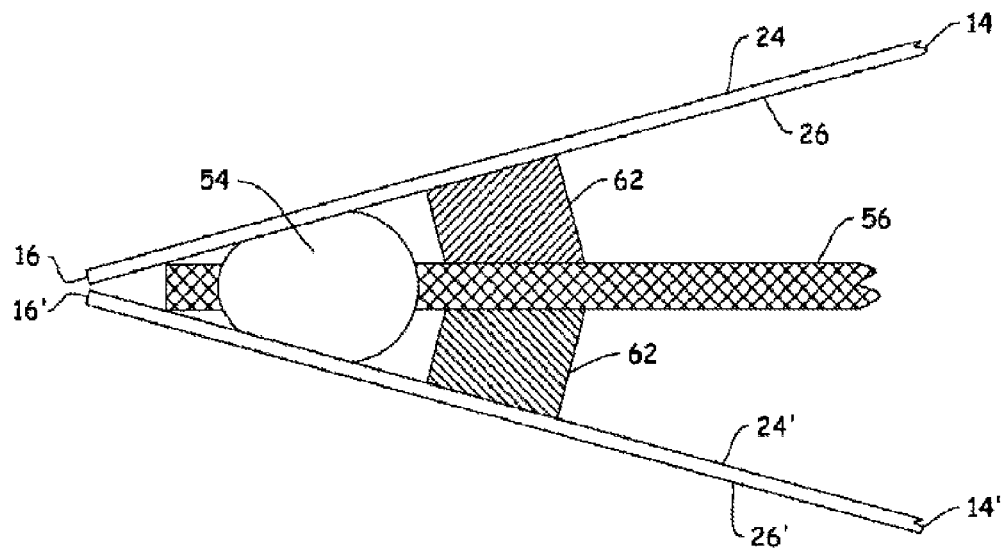
FIG. 8 is an idealized elevational view (partially cut-away) of two adjacently positioned membrane sheets and a feed spacer sheet, seal and restraining member located between the membrane sheets.

FIG. 8 illustrates another embodiment of a membrane sheet arrangement similar to that of FIG. 7, showing an idealized elevational view (partially cut-away) of two adjacently positioned membrane sheets (14, 14') and a seal (54) in contact with the opposing outer surfaces (24', 26) of the membrane sheets (14, 14'). In the illustrated embodiment, the seal (54) comprises a single band of sealant. In distinction to the embodiment of FIG. 7, a feed spacer sheet (56) is positioned between the membrane sheets (14, 14') and is also in contact with the seal (54) at a location adjacent to the proximal edges (16, 16') of the facing membrane sheets (14, 14'). The seal (54) serves to anchor the feed spacer sheet (56) between the adjacently positioned membrane sheets. In further distinction from the embodiment of FIG. 7, restraining members (62) are positioned distal to the seal (54) (i.e. at a location closer to the distal edge of the membrane sheet). The restraining members (62) may be fixed or adhered to the feed spacer sheet (56) and are in contact with the outer surfaces (26, 24') of the facing membrane sheets (14, 14'). As previously noted, the restraining member (62) may be made from flexible materials such as a compressible foam. Preferably, the restraining member (62) is not attached or adhered to the outer surface of the membrane sheet but rather is mechanically biased against the sheet in a manner to limit movement of the sheet at locations distal to the seal.

While principles of the invention are amenable to various modifications and alternative forms, particular species have been described by way of examples and detailed description. It should be understood that the intent of this description is not to limit the invention to the particular embodiments described or examples provided, but rather to cover all modifications, equivalents, and alternatives falling within the spirit and scope of the disclosure. The spiral wound modules of the present invention may be used in a wide variety of fluid applications including gas separation and liquid separations including reverse osmosis (RO), nanofiltration (NF), ultrafiltration (UF) and microfiltration (MF) liquid separations. While the various embodiments have been describe in terms of a conventional flow pattern, it will be appreciated that the flow pattern may be reversed such that feed liquid enters the module via the permeate collection tube (better characterized in such embodiments as a "feed fluid tube" or generically as a "fluid tube"), and passes into the membrane sheet(s) by way of capillary channels in fluid communication with the tube. A portion of the feed fluid selectively passes from the capillary channels and through the porous structure of the membrane sheet, resulting in permeate fluid passing along the outer surfaces of the membrane sheet which exits the module via a permeate fluid pathway (coinciding with the aforementioned "feed fluid pathway" or generically as a "fluid pathway"). It will be appreciated the use of the terms "feed" and "permeate" have been used for purposes of convenience only, and that the present invention expressly includes both fluid flow directions.

It will be appreciated that one or more membrane sheets may be utilized within a module. While described as rectangular sheet, the membrane sheet may include other shapes. Use of one or more feed spacer sheets is optional. Examples of suitable feed spacer sheets are described in: US 2008/0290031; U.S. Pat. No. 7,459,082; U.S. Pat. No. 6,881,336 and U.S. Pat. No. 4,834,881. In those embodiments where the permeate collection tube comprises arc segments, any number of individual arc segments can be used, e.g. 2-100. The preferred number of arc segments may depend upon the diameter of the tube, the number of desired membrane sheets, and the means for securing the arc segments together.

Many embodiments of the invention have been described and in some instances certain embodiments, selections, ranges, constituents, or other features have been characterized as being "preferred." Characterizations of "preferred" features should in no way be interpreted as designated such features as being required, essential or critical to the invention. It will be understood that certain features and sub-combinations are of utility and may be employed without reference to other features and sub-combinations. References to ranges of numerical values expressly include the end points of such ranges.

The entire subject matter of each US patent reference mentioned herein is incorporated by reference.

The invention claimed is:

1. A spiral wound module comprising at least one extruded membrane sheet wrapped about a permeate collection tube wherein the membrane sheet comprises:
   a porous structure formed by extruding a polymer mixture into a sheet including a plurality of capillary channels,
   a proximal edge extending along the permeate collection tube,
   a distal edge,
   a front and back edge which both extend from the proximal edge to the distal edge, and
   first and second opposing outer surfaces; wherein:
   the module further comprises a feed fluid pathway which extends along the first and second outer surfaces of the membrane sheet and wherein the porous structure of the membrane sheet provides selective fluid communication between the feed fluid pathway and the capillary channels,
   the capillary channels are positioned between the first and second outer surfaces, extend in parallel arrangement from the proximal edge to the distal edge and are in fluid communication with the permeate collection tube, and
   a seal located upon the first and second outer surfaces of the membrane sheet extending from the front edge to the back edge along a path adjacent to the proximal edge which isolates the capillary channels from the feed fluid pathway and a restraining member comprising a compressible foam positioned adjacent to the seal.

2. The spiral wound module of claim 1 wherein at least a portion of the first and second outer surfaces of the membrane sheet comprise a hyperfiltration discriminating layer having an average thickness of less than 1 micron.

3. The spiral wound module of claim 1 wherein a reinforcement layer is disposed upon a portion of the first and second outer surfaces of the membrane sheet which extends from the front edge to the back edge of the membrane sheet along a path adjacent to the proximal edge.

4. The spiral wound module of claim 3 further comprising a hyperfiltration discriminating layer disposed directly upon a portion of the porous structure of the first and second outer surfaces of the membrane sheet, and wherein the reinforcement layer is disposed directly upon the porous structure of the membrane sheet.

5. The spiral wound module of claim 1 wherein the restraining member is in contact with less than 10% of the length an outer surface of the membrane sheet extending from the proximal edge to the distal edge which limits movement of the membrane sheet at locations distal to the seal.

6. The spiral wound module of claim 5 wherein the restraining member is mechanically biased against the outer surface of the membrane sheet.

7. The spiral wound module of claim 1 wherein the proximal edge of the membrane sheet is disposed through a slot located in the permeate collection tube.

8. The spiral wound module of claim 7 wherein the permeate collection tube comprises a plurality of arc segments; and wherein the slot comprises an interface area located between directly adjacent arc segments of the permeate collection tube.

9. The spiral wound module of claim 1 wherein at least one of the front and back edge has a non-porous structure having a tensile strength of at least twice as great as the porous structure and wherein no capillary channels are present.

* * * * *